United States Patent [19]
Ohtsubo

[11] 4,311,383
[45] Jan. 19, 1982

[54] METHOD FOR DETERMINATION OF VELOCITY AND DIRECTION OF MOTION OF MOVING OBJECT BY SPECKLE PATTERNS AND APPARATUS THEREFOR

[75] Inventor: Junji Ohtsubo, Tanashi, Japan

[73] Assignees: Agency of Industrial Science & Technology; Ministry of International Trade & Industry, both of Tokyo, Japan

[21] Appl. No.: 81,870

[22] Filed: Oct. 4, 1979

[30] Foreign Application Priority Data

Oct. 9, 1978 [JP] Japan ................. 53-124392

[51] Int. Cl.$^3$ .............................. G01P 3/36
[52] U.S. Cl. ........................ 356/28.5; 356/28
[58] Field of Search ................. 356/28, 28.5

[56] References Cited
U.S. PATENT DOCUMENTS
3,511,569 5/1970 Mackta ..................... 356/28.5

OTHER PUBLICATIONS
R. L. Schwiesow et al., Appl. Optics, vol. 16, No. 5, May 1977.
J. Ohtsubo et al., Optical & Quantum Electronics, vol. 8, No. 6, Nov. 1976, p. 523.
Y. N. Dubnistchev et al., Optics & Laser Technology, Jun. 1976.
P. Chen, IEEE Transactions on Instrumentation & Measurement, vol. IM-25, #2, p. 108, Jun. 1976.

*Primary Examiner*—S. C. Buczinski
*Attorney, Agent, or Firm*—Kurt Kelman

[57] ABSTRACT

Disclosed herein is a method and apparatus for determining the velocity and direction of motion of moving object by directing two coherent light beams onto the object and thereby causing moving speckles including information on the velocity to be formed in a diffraction plane, deriving time-space cross-correlations from the variations of time-space intensities of the speckles, analyzing the motion of the object in the two directional components based on the time-space cross-correlations and determining the velocity and direction of motion at the same time.

8 Claims, 4 Drawing Figures

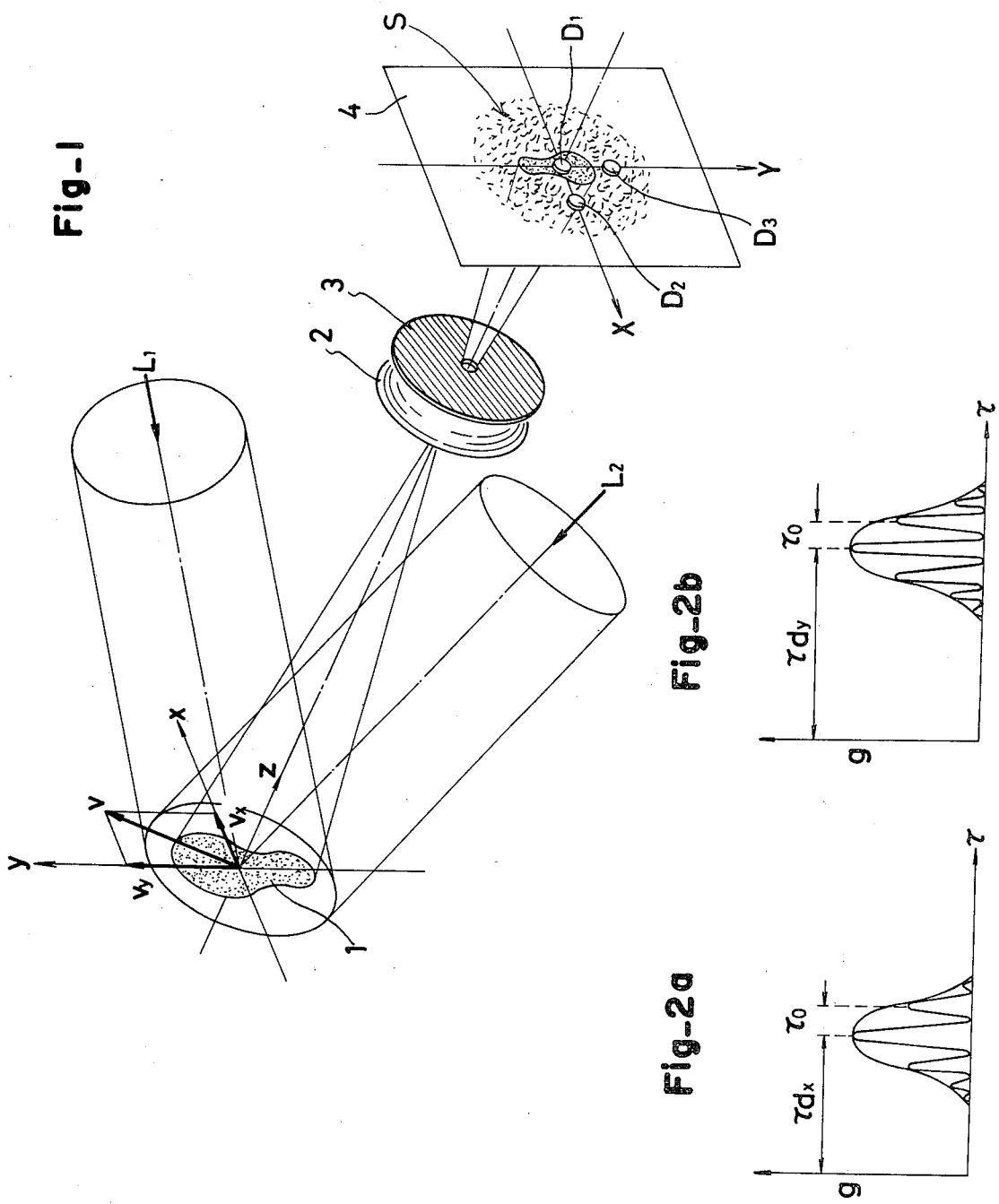

METHOD FOR DETERMINATION OF VELOCITY AND DIRECTION OF MOTION OF MOVING OBJECT BY SPECKLE PATTERNS AND APPARATUS THEREFOR

BACKGROUND OF THE INVENTION

This invention relates to a method for determining the velocity vector, speed and direction, of the motion of a moving object by directing two coherent light beams onto the moving object and analyzing the two directional components in the time-space cross-correlation of the moving speckle patterns produced by the light directed onto the object, and to an apparatus to be used for the working of this method.

A number of methods have heretofore been developed for the purpose of determining the scalar velocity of a moving object without mechanically contact the moving object. One of these, called the "Doppler method for velocity measurement", makes use of the Doppler effect produced by use of a laser beam. Specifically, this Doppler method determines the velocity of a moving object by directing a laser beam onto the moving object, causing the resultantly scattered light to form a defraction pattern and detecting the beat frequency which occurs in the form of changes in bright and dark fringes over the course of time. Indeed, this method permits extremely accurate determination of the velocity of a moving object such as a fluid. Nevertheless, it is incapable of determining the direction in which the object is moving.

Great advances have been made in recent years in the utilization of laser beams in the determination of physical phenomena. For example, there has been proposed a method involving utilization of the speckle pattern which can be produced by a laser beam. When a laser beam is directed onto the rough surface of a moving object, the light is scattered by the rough surface and different parts of the scattered light interfere with one another in the surrounding space to give rise to countless bright spots which form what is called a "speckle pattern". The speckle pattern method based on this principle determines the velocity of a moving object by making use of the proportional relation between the velocity of this speckle pattern and the velocity of the object itself.

The determination of the velocity of a moving object by means of the speckle pattern has so far been discussed by E. Jakeman of the Royal Radar Establishment (currently Royal Signals and Radar Establishment) of Britain in "The Effect of Wavefront Curvature on the Coherence Properties of Laser Light Scattered by Target Centers in Uniform Motion" [J. Phys. A: Math Gen., Vol. 8, No. 2 (1975)]. This publication, dealing with the method for determining the velocity of a moving object by causing the laser beam to be scattered by the object and correlating the speckle pattern produced in consequence of the light scattering, discloses an approach to the calculation of the velocity by means of the ordinary vector coordinate system. It says nothing about the quantity and direction of displacement of the moving object in the two-dimensional system. The optical arrangement which is involved in the determination uses one beam of incident light and two detection units. A dissertation discussing this subject more extensively is made by Ichiro Yamaguchi in a Japanese journal titled "Applied Physics", Vol. 46, No. 8 (1977), pp 803–812. This article starts with an introduction of the speckling phenomenon and characteristics and goes on to discuss application of the speckle pattern to astronomical observation, determination of the displacement, deformation, vibration, velocity and revolution of moving objects, determination of the surface roughness of objects and the like. In the publication, the author proposes to classify into several groups, by the type of optical arrangement, all the methods available for determining kinetic displacements of objects having a light diffusing surface by virtue of the deformation of speckle. To one of these groups belongs a "one light-flux and two-aperture image formation method" which comprises directing the laser beam onto a given light-diffusing surface, causing the scattered light to pass through two pinholes and impinge upon a diffraction plane so as to give rise to a speckle pattern, and then subjecting the formed speckle pattern to observation and analysis. There has also been proposed a "two light-flux and one-aperture image formation method" which comprises directing two laser beams, each at a specific angle of incidence, onto the light-diffusing surface, causing the scattered light to pass through one pinhole and impinge upon a diffraction plane so as to give rise to a speckle pattern, and subjecting the formed speckle pattern to observation and analysis. These two methods invariably aim to accomplish the determination of the displacement of a moving light diffusing object by measuring, in terms of the frequency of Doppler beat, the quantity of change in the phase difference of the two speckle patterns produced before and after the displacement of the light diffusing object. As clearly indicated in the respective pieces of literature cited above, these methods permit the determination of the displacement only in the direction perpendicular to the axis of the incident beam of light because the observation is made exclusively of the fringe intensity in the lateral displacement which is parallel to the direction connecting the two incident laser beams or the two pinhole apertures.

Of the two methods described above, the "one light-flux and two-aperture image formation method" has been discussed by H. Shimomura in the Glossary of Drafts, 30p-G-5 (1977), pp. 225 submitted to the 25th Meeting of the Applied Physics Society under the title of "Discussion on Optical System for the Two-Aperture Type Laser Doppler Speed Meter". This dissertation clearly indicates that the conventional two-aperture method is capable of only determining the velocity of a given moving object in one direction because the determination is based on the observation of Doppler beat.

An object of this invention is to provide a method for determining the velocity and direction of motion of a moving object, which method permits the determination to be carried out over a wide range of velocities with high resolvability and high reliability by causing the measurement of the velocity and direction of motion to be effected in two directional components of the moving object by making use of the moving speckle pattern to be obtained by the two light-flux and one-aperture image formation method, and an apparatus to be used for working the method described above.

SUMMARY OF THE INVENTION

To accomplish the object described above according to the present invention, there is provided a method for determining the velocity and direction of motion of a given light diffusing object by the speckle pattern, which method comprises directing two beams of coherent light at differing angles of incidence upon the light diffusing object, causing the beams of light scattered by the light-diffusing surface of the object to form an image including moving speckles on a diffraction plane such as the image-formation plane or the Fresnel's plane, deriving the time-space cross-correlation with respect to the variations of the beat period and the peak position in an envelope such as of a Gaussian curve modulated with the Doppler beat due to the variations in the time-space intensities of the aforementioned moving speckles in each of the two pairs formed between one common point taken suitably in the image plane to serve as the origin of the X-Y coordinates and two points taken each at a fixed distance from the aforementioned common point (origin), one on the X axis and the other on the Y axis, and thereby determining the velocity of the motion of the light diffusing object and the direction of the motion in terms of the two directional components in the X and Y coordinates.

The variation in the intensity of the speckle pattern on the diffraction plane can be measured by causing the speckle to be detected by photomultipliers or some other similar detectors which are provided as means for sensing the variation of intensity at proper locations, allowing the variation in electric potential issuing consequently as the output of the device to be fed into and arithmetically processed by a correlator and thereby subjecting the resultant x- and y-axis vectors to electronic processing and determination. Thus, the velocity and direction of motion of the object can be simultaneously determined with high accuracy without entailing any complication of the optical system of the equipment.

The other objects and characteristics of the present invention will become apparent from the further disclosure of the invention to be given hereinafter with reference to the accompanying drawing.

BRIEF EXPLANATION OF THE DRAWING

FIG. 1 is a schematic explanatory diagram of one preferred embodiment of the optical system of the apparatus of this invention for the formation of speckle pattern in the determination of the motion of a moving object.

FIGS. 2a and 2b are graphs showing the distribution of the intensity of cross-correlation as obtainable on the basis of the speckle pattern produced by the optical system of FIG. 1.

DESCRIPTION OF THE PREFERRED EMBODIMENT

Figure 3:
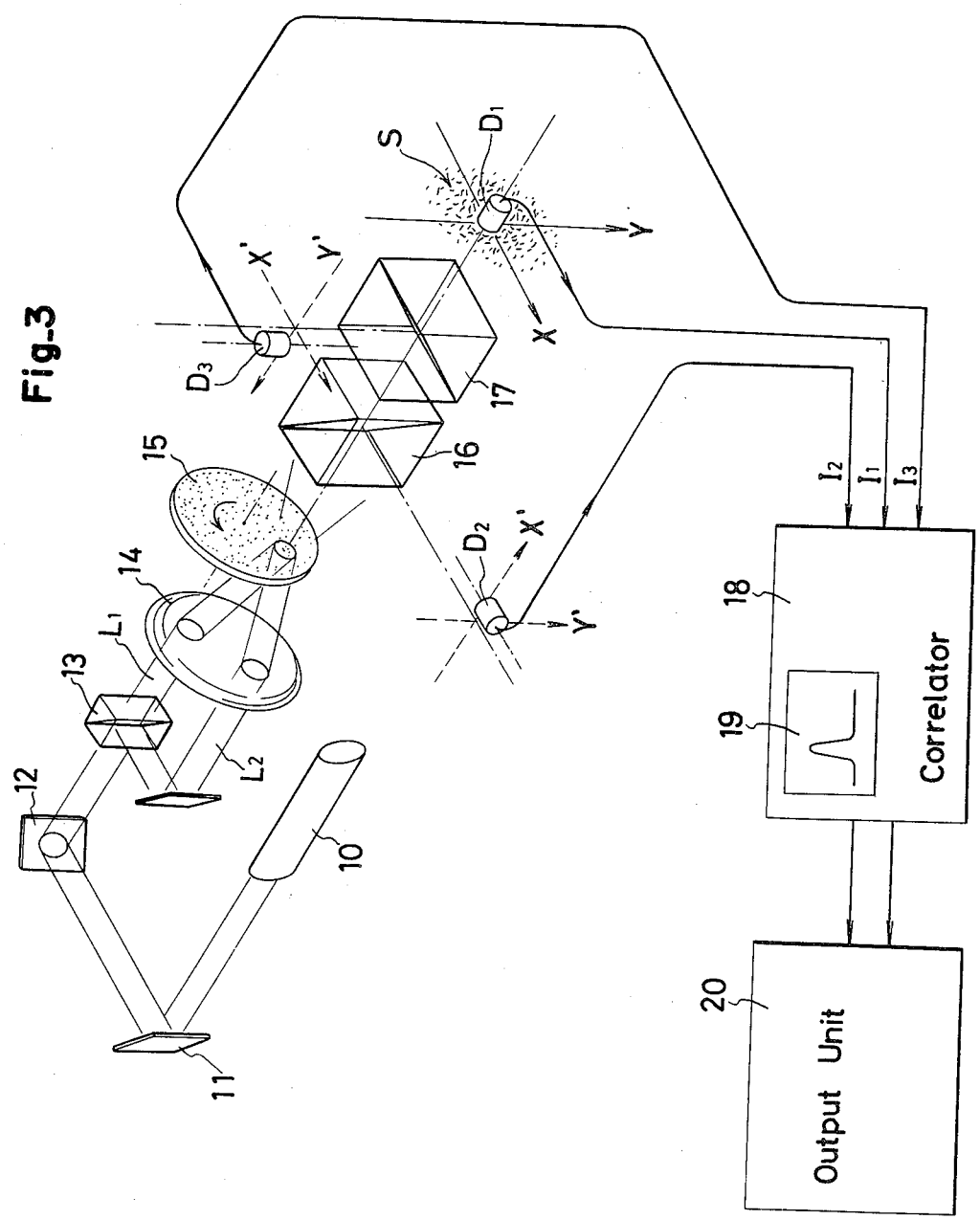
FIG. 3 is a schematic diagram of another preferred embodiment of the optical system for determining the motion of a moving object by means of the speckle pattern according to the present invention.

This invention relates to a method for the simultaneous determination of the velocity and direction of motion of a moving object on the basis of the time-space cross-correlation in the two directional components of the speckle pattern which is obtained by the two light-flux and one-aperture image formation method, and to an apparatus to be used for working the method.

When a coherent light such as a laser beam is directed onto a light diffusing surface such as the surface of frosted glass or paper, there is produced an irregular speckled pattern called a "speckle pattern". If the object exposed to the coherent light is a moving object having a rough surface or is a mass of moving particles in a fluid, a speckle pattern which varies with the motion of the object and contains information concerning the velocity of the object can be observed on the diffraction plane such as the Fresnel plane or the image plane.

The determination according to this invention utilizes the two light-flux and one-aperture image formation method as roughly illustrated in FIG. 1. A moving light-diffusing object 1 is assumed to be in motion at a vector velocity "v" in one definite direction in the x-y plane. The velocity and direction of motion of this light-diffusing object can be represented by the vector component $v_x$ in the x-axis, and the vector component $v_y$ in the y-axis. Let "z" stand for a line perpendicular to the x-y plane. When two beams of coherent light $L_1$ and $L_2$ are directed onto the moving object 1 at different angles of incidence in the same y-z plane, the image of this moving object is focused through a lens 2 and a pinhole 3 upon an image plane (X-Y plane) 4 serving as the diffraction plane and, at the same time, speckles S which move with the movement of the object (termed "moving speckles" throughout the specification and claims) and include information about the velocity of the moving object 1 appear in the image plane 4. When detectors $D_1$, $D_2$ and $D_3$ each formed of a photoelectric element, such as a photomultiplier, an addressed CCD, a channel plate or photodiode array, are disposed in the image plane 4 at intervals from one another in such a positional relationship that the two detectors $D_1$ and $D_2$ fall on the X axis and the two detectors $D_1$ and $D_3$ fall on the Y axis, then these detectors $D_1$, $D_2$ and $D_3$ issue output signals $I_1$, $I_2$ and $I_3$ respectively whose intensities are varied along the time course by the moving speckles. Then, the normalized time-space cross-correlation in the scattered field is calculated on the basis of the signals $I_1$, $I_2$ and $I_3$ obtained by each of the detectors paired with respect to the X and Y axes. Since the numerous scattering cells on the light-diffusing surface of the moving object contribute to form the complex amplitudes $a_1$ and $a_2$ on the respective axes of the diffraction plane 4 and these complex amplitudes $a_1$ and $a_2$ and may be assumed to obey the complex Gaussian random process, the normalized time-space cross-correlation function, g, of the intensities of the scattered light can be expressed as follows:

$$g = \frac{<I(r_1, t_1) \cdot I(r_2, t_2)>}{<I(r_1, t_1)><I(r_2, t_2)>} \quad (1)$$

wherein, I denotes the output current signal of a given detector as caused by the scattered light from the light-diffusing object whose vector coordinates in the time interval of $(t_1 - t_2)$ are $r_1$ and $r_2$.

Now, let $\tau$ stand for the time interval $(=t_1 - t_2)$, l stand for the separation of the detectors $(=\sqrt{l_x^2 + l_y^2})$, and v stand for the velocity of the motion of the light-diffusing object (vector: $v_x$, $v_y$), and the cross-correlation function of the intensities of speckles will be derived by the substitution of Formula (1) as follows:

$$g(\tau, l) = 1 + \exp\left(-a^2l^2 + \left(\frac{\tau d}{\tau_c}\right)^2\right) \quad (2)$$

$$\exp\left(-\frac{1}{\tau_c^2}(\tau-\tau_d)^2\right)\cdot\cos^2\left(\pi\frac{\tau}{\tau_o}\right)$$

wherein, $\tau_o$ denotes the period of the Doppler beat frequency ($=b/v_x$), $\tau_c$ the Doppler envelope beat period ($=c/v$) and $\tau_d$ the time displacement (deviation of peak value) ($=d\cdot(v_x l_x + v_y l_y)/v^2$). (Here, a, b, c and d are constants to be determined by the particular optical system to be used.)

The cross-correlations calculated with respect to the detectors $D_1$ and $D_2$ in the X axis and the detectors $D_1$ and $D_3$ in the Y axis will describe curves like the ones shown in FIGS. 2a and 2b respectively.

As is widely known, the velocity of the light diffusing object can be obtained on the basis of the aforementioned Doppler beat frequency. The direction of the motion of the light diffusing object is obtained as follows.

As is plain from Formula (2), the time-space cross-correlation function of the speckle intensity fluctuations consists of the product of three terms. The first is the decay term of the envelope like a Gaussian curve, which is equal to or less than unity due to the space separations $l_x$ and $l_y$. The second is a time-dependent Gaussian envelope decay term involving the time displacement $\tau_d$. And the third term is the derivative of the Doppler shift frequency which results from the two symmetric coherent light beams. The period of this Doppler beat frequency $\tau_o$ is inversely proportional to the x component of the vector velocity v, i.e. $v_x$. On the assumption that two of the three detectors on the diffraction plane are separated on the X axis, i.e. $l_y=0$, the time displacement at the peak time in the second envelope such as a Gaussian curve is directly proportional to the velocity of $v_x$, i.e. $\tau_{dx}$ of FIG. 2a $\propto v_x/v^2$. Under the same condition, $\tau_{dy}$ of FIG. 2b $\propto v_y/v^2$ is satisfied for $l_x=0$. The sign of the time displacement $\tau_d$ depends on the time displacements of such parameters as $v_x$ and $v_y$. For fixed optical constants, the directions of the velocities $v_x$ and $v_y$ can be determined on the basis of the signs of the time displacement $\tau_d$ of the cross-correlations along the X and Y axes. Once the directions of the velocities $v_x$ and $v_y$ are found, then the direction of the motion of the light diffusing object can be automatically determined by the reconstruction of their respective vector intensities.

An experiment was actually performed concerning the cross-correlation of the speckle pattern which changed in the time-space dimensions of the diffraction field produced in consequence of the irradiation of a light diffusing object by two coherent laser beams. This experiment is described with reference to FIG. 3. In the preferred embodiment of FIG. 2, the speckle pattern was formed in the image plane. In the experiment to be described below, the Fresnel plane was used for the formation of the speckle pattern.

A light beam issuing from a single-mode oscillation He-Ne laser 10 rated for 6328 Å of wavelength was reflected by two mirrors 11, 12 and then split into two beams $L_1$, $L_2$ by means of a beam splitter 13. The two split laser beams were converged through one common lens 14 (having a focal length of 297 mm in the experiment) into one point behind the lens 14. The incident beams on this lens had a radius of 595 μm in this experiment. A light diffusing object of #600 ground glass was disposed in the plane of intersection of the beams to give rise to a speckle pattern S in the space of the X-Y plane (Fresnel plane) behind the light diffusing object 15. In the diagram, an imaginary speckle pattern is shown in the X-Y plane. A speckle pattern having an average size of about 26.0 mm was observed in the space of the X-Y plane when the beams impinging upon the light diffusing object at an incident angle of 0.0248 rad. and the beam waist occurred 83 mm behind the light diffusing object.

On the assumption that the light diffusing object 15 is rotated at a fixed angular speed, a desired change in the velocity of the motion of the light diffusing object can be attained by changing the position at which the converging laser beams are focused with respect to the center of the rotation. The angular speed of the motion of the light diffusing object was measured with a monitor and the results of this measurement were compared with the results of the determination by the method of this invention. The scattered light from the light diffusing object 15 was split by means of two half mirrors 16, 17. The splitting is made for the purpose of permitting the desired determination to be effectively performed even when the separation of the two detectors used for the detection of the speckle pattern is smaller than the size of each detector. The detectors $D_1$, $D_2$ and $D_3$ actually used in the experiment were each a photomultiplier provided with a pinhole smaller than the size of the average grain of the speckles. The detector $D_1$ was disposed stationarily to serve as the origin of the X-Y coordinates and the other detectors $D_2$ and $D_3$ were installed so as to be freely moved along the X and Y axes to a desired distance from the origin. If the light diffusing object actually used in the experiment happens to be in motion in a fixed direction at a fixed angular speed, then use of only two detectors, the pair of $D_1$ and $D_2$ for example, will suffice. In other words, the determination in this case can be effectively obtained by having the detector $D_2$ moved horizontally or vertically in the Y or X axis with reference to the detector $D_1$ which is stationary. The photoelectric current signals $I_1$, $I_2$ and $I_3$ thus detected were amplified with a digital correlator 18 which can be a mini-computer, for example, and stored therein. Consequently, the time-space cross-correlation of the variations of speckle intensities was computed, displayed on the monitor 19 and finally recorded in the output device 20, such as an X-Y plotter, a CRT or a printer.

In this experiment, the detectors were separated by a varying distance in the range of from 0 to 3 mm. The Doppler beat frequency and the peak position in the decay of the envelope such as a Gaussian curve modulated by the Doppler beat obtained in the experiment were found to agree satisfactorily with the theoretical results. It was confirmed that the cross-correlation of these factors also agreed satisfactorily with the theoretical values. The results all indicate that the method of this invention is practicable.

According to the method of the present invention, use of a very simple apparatus substantially similar to any conventional Doppler velocimeter or a speckle velocimeter permits simultaneous determination of the two directional components of the velocity of a moving object through a very simple operation and data processing. While the Doppler speed meter and other similar conventional apparatuses are aimed at determining the motion of a mirror-face object or a single particle, the method of this invention permits effective determination of the motion of a very common object of rough surface or a mass of particles.

What is claimed is:

1. A method for determining the velocity and direction of motion of a moving object by means of speckles moving with the motion of the object, comprising the steps of:
   (a) directing two coherent light beams in different directions onto the moving object to produce light scattered by the moving object, and causing the scattered light to form moving speckles in a diffraction plane containing orthogonal X and Y axes;
   (b) establishing at least two pairs of spatially disposed sensing points in said diffraction plane, each of said pairs formed from one common point and one associated other point displaced a distance l from said common point, at least one of said pairs disposed along said X axis with its associated other point displaced $l_x$ from said common point, and at least one other of said pairs disposed along said Y axis with its associated other point being displaced $l_y$ from said common point;
   (c) sensing the time variations of the moving speckles for each pair of detectors at said spatially disposed pairs of sensing points and processing said sensed intensities to produce an output signal with a cross-correlation function according to the formula $$g(\tau,l) = 1 + \exp\left\{-a^2 l^2 + \left(\frac{\tau_d}{\tau_c}\right)^2\right\} \cdot$$

$$\exp\left\{-\frac{1}{\tau_c^2}(\tau - \tau_d)^2\right\} \cdot \cos^2\left(\pi \frac{\tau}{\tau_o}\right)$$

where a is an optical system constant and where the output of the correlation function of the formula consists of the product of three terms, the first being an amplitude decay term, the second being a time-dependent envelope amplitude decay term, and the third being a sinusoid originating from the doppler beat frequency produced by the intensities sensed by any one of said at least two pairs of sensing points, and wherein $\tau_o$ is the period of the doppler beat frequency, $\tau_c$ is the doppler envelope beat period and $\tau_d$ is the time displacement of the peak amplitude of said time-dependent envelope amplitude decay term along an observation interval $\tau$ axis referenced to a predetermined observation start time; and
   (d) determining the velocity and direction of motion of the moving object in terms of two directional components along said X and Y axes, where the magnitude of each component is obtained by determining the magnitude of the time displacement of the peak amplitude of said envelope decay term from said reference observation start time for the corresponding axis, and the sign of each component is obtained by determining the displacement direction of the peak amplitude of said envelope decay term from the corresponding axis for said reference observation start time.

2. The method according to claim 1, wherein the diffraction plane is an image plane.

3. The method according to claim 1, wherein the diffraction plane is the Fresnel plane.

4. An apparatus for determining the velocity and direction of motion of a moving object by means of speckles moving with the motion of the object, which comprises:
   (a) a source of two coherent light beams;
   (b) an optical system arranged to direct the light beams in different directions onto the object to produce light scattered by the object, and further to focus the scattered light upon a diffraction plane thereby to form moving speckles in the diffraction plane;
   (c) at least three detectors for sensing temporal and spatial intensities of the moving speckles, said detectors arranged in at least two pairs of spatially disposed points along X and Y axes contained in said diffraction plane, each of said pairs formed from one common point and one associated other point displaced a distance l from said common point, at least one of said pairs disposed along said X axis with its associated other point being displaced by $L_x$ from said common point, and at least one other of said pairs disposed along said Y axis with its associated other point being displaced by $l_y$ from said common point;
   (d) correlation means for determining temporal and spatial correlations of the intensities of the moving speckles and for providing an output signal having a cross-correlation function according to the formula $$g(\tau,l) = 1 + \exp\left\{-a^2 l^2 + \left(\frac{\tau_d}{\tau_c}\right)^2\right\} \cdot$$

$$\exp\left\{-\frac{1}{\tau_c^2}(\tau - \tau_d)^2\right\} \cdot \cos^2\left(\pi \frac{\tau}{\tau_o}\right)$$

where a is an optical system constant and where the output of the correlation function of the formula consists of the product of three terms, the first being an amplitude decay term, the second being a time-dependent envelope amplitude decay term, and the third being a sinusoid originating from the doppler beat frequency produced by the intensities sensed by said at least two pairs of sensing points, and wherein $\tau_o$ is the period of the doppler beat frequency, $\tau_c$ is the doppler envelope beat period and $\tau_d$ is the time displacement of the peak amplitude of said time-dependent envelope amplitude decay term along the observation interval $\tau$ axis referenced to a predetermined observation start time; and
   (e) an output display device for presenting velocity and direction of motion information of the moving object from the correlation means in terms of two directional components along said X and Y axes, where the magnitude of each component is obtained by determining the magnitude of the time displacement of the peak amplitude of said envelope decay term from said reference observation start time for the corresponding axis, and the sign of each component is obtained by determining the displacement direction of the peak amplitude of said envelope decay term from the corresponding axis for said reference observation start time.

5. The apparatus according to claim 4, wherein the optical system comprises a lens and pinhole.

6. The apparatus according to claim 4, wherein the optical system is adapted to cause the scattered light to form moving speckles of the object in the Fresnel plane.

7. The apparatus according to claim 6, wherein the optical system is adapted to direct the split light beams with different angles of incidence onto the object.

8. The apparatus according to claim 6, wherein at least one of said detectors is disposed on a diffraction plane equivalent to the diffraction plane and at least one half mirror is further installed between the moving object and said diffraction plane to split the light scattered by the object thereby causing the split light to be directed onto said equivalent diffraction plane.

* * * * *